(12) United States Patent
Furht et al.

(10) Patent No.: US 11,611,768 B2
(45) Date of Patent: Mar. 21, 2023

(54) IMPLICIT SIGNALING OF ADAPTIVE RESOLUTION MANAGEMENT BASED ON FRAME TYPE

(71) Applicant: OP Solutions, LLC, Newton, MA (US)

(72) Inventors: Borivoje Furht, Boca Raton, FL (US); Hari Kalva, Boca Raton, FL (US); Velibor Adzic, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 16/948,123

(22) Filed: Sep. 3, 2020

(65) Prior Publication Data

US 2021/0044820 A1 Feb. 11, 2021

Related U.S. Application Data

(63) Continuation of application No. PCT/US2020/045220, filed on Aug. 6, 2020.
(Continued)

(51) Int. Cl.
*H04N 19/105* (2014.01)
*H04N 19/159* (2014.01)
*H04N 19/44* (2014.01)
*H04N 19/96* (2014.01)
*H04N 19/176* (2014.01)
(Continued)

(52) U.S. Cl.
CPC ........... *H04N 19/44* (2014.11); *H04N 19/105* (2014.11); *H04N 19/117* (2014.11); *H04N 19/159* (2014.11); *H04N 19/176* (2014.11); *H04N 19/625* (2014.11); *H04N 19/96* (2014.11)

(58) Field of Classification Search
CPC ........ H04N 19/44; H04N 21/44; H04N 19/23; H04N 19/58; H04N 19/70; H04N 19/174; H04N 19/59; H04N 19/105; H04N 19/159
See application file for complete search history.

(56) References Cited

U.S. PATENT DOCUMENTS 8,144,764 B2 * 3/2012 Hannuksela ........... H04N 19/89
375/240.01
9,305,558 B2 4/2016 Chen et al.
(Continued)

FOREIGN PATENT DOCUMENTS

| EP | 3057319 A1 | 8/2016 |
|---|---|---|
| WO | 2018130414 A1 | 7/2018 |
| WO | 2019141907 A1 | 7/2019 |

OTHER PUBLICATIONS

NPL Google Search; 2020. (Year: 2020).*
(Continued)

*Primary Examiner* — Luis Perez-Fuentes
(74) *Attorney, Agent, or Firm* — OP Solutions IP Department; Paul Ackerman

(57) ABSTRACT

A method includes receiving a bit stream; determining, using the bit stream and for a current frame, whether the current frame is available to be used as a reference frame; setting, in response to determining that the current frame is available to be used as a reference frame, a variable characterizing that an adaptive resolution management mode is disallowed; and reconstructing pixel data of the current frame, wherein the adaptive resolution management mode is disallowed. Related apparatus, systems, techniques and articles are also described.

1 Claim, 7 Drawing Sheets

Related U.S. Application Data

(60) Provisional application No. 62/883,484, filed on Aug. 6, 2019.

(51) Int. Cl.
*H04N 19/117* (2014.01)
*H04N 19/625* (2014.01)

(56) References Cited

U.S. PATENT DOCUMENTS

| | | | |
|---|---|---|---|
| 9,319,677 B2 | 4/2016 | Chang et al. | |
| 9,565,397 B2 | 2/2017 | Frink et al. | |
| 9,648,351 B2* | 5/2017 | Su | H04N 19/65 |
| 9,686,565 B2* | 6/2017 | Goel | H04N 19/59 |
| 10,547,851 B2* | 1/2020 | Li | H04N 19/174 |
| 11,102,498 B2* | 8/2021 | Furht | H04N 19/176 |
| 11,140,386 B2* | 10/2021 | Zhang | H04N 19/189 |
| 11,206,404 B2* | 12/2021 | Topiwala | H04N 19/136 |
| 11,431,964 B2* | 8/2022 | Zhang | H04N 19/159 |
| 2001/0014178 A1 | 8/2001 | Boon | |
| 2005/0117815 A1 | 6/2005 | Lippincott | |
| 2007/0160153 A1 | 7/2007 | Sullivan | |
| 2009/0060034 A1 | 3/2009 | Park et al. | |
| 2009/0161762 A1* | 6/2009 | Jun | H04N 21/440263 375/240.16 |
| 2010/0080287 A1 | 4/2010 | Ali | |
| 2010/0150231 A1* | 6/2010 | Huang | H04N 19/59 375/240.12 |
| 2011/0013692 A1 | 1/2011 | Cohen et al. | |
| 2012/0069135 A1 | 3/2012 | Cipolli et al. | |
| 2012/0269275 A1* | 10/2012 | Hannuksela | H04N 19/61 375/240.25 |
| 2013/0089135 A1 | 4/2013 | Chen et al. | |
| 2013/0089154 A1* | 4/2013 | Chen | H04N 19/423 375/240.25 |
| 2013/0177084 A1 | 7/2013 | Wang et al. | |
| 2013/0188730 A1 | 7/2013 | Hong et al. | |
| 2013/0266067 A1 | 10/2013 | Song et al. | |
| 2014/0072038 A1* | 3/2014 | Samuelsson | H04N 19/70 375/240.12 |
| 2014/0269912 A1 | 9/2014 | Sullivan | |
| 2014/0328387 A1 | 11/2014 | Puri et al. | |
| 2014/0355676 A1 | 12/2014 | Seregin et al. | |
| 2014/0355692 A1* | 12/2014 | Ramasubramonian | H04N 19/70 375/240.26 |
| 2015/0036754 A1* | 2/2015 | Hendry | H04N 19/895 375/240.25 |
| 2015/0195554 A1 | 7/2015 | Misra | |
| 2015/0195573 A1 | 7/2015 | Aflaki | |
| 2015/0201204 A1 | 7/2015 | Chen | |
| 2015/0222928 A1 | 8/2015 | Tian | |
| 2015/0264404 A1 | 9/2015 | Hannuksela et al. | |
| 2015/0304665 A1 | 10/2015 | Hannnuksela et al. | |
| 2015/0319442 A1 | 11/2015 | Puri | |
| 2017/0085917 A1 | 3/2017 | Hannuksela et al. | |
| 2017/0155911 A1 | 6/2017 | Lin | |
| 2018/0098089 A1 | 4/2018 | Chen et al. | |
| 2018/0160117 A1 | 6/2018 | Mukherjee et al. | |
| 2019/0089976 A1 | 3/2019 | Huang et al. | |
| 2019/0149837 A1 | 5/2019 | Lim et al. | |
| 2019/0230285 A1 | 7/2019 | Kim | |
| 2020/0045313 A1 | 2/2020 | Leleannec | |
| 2020/0366888 A1 | 5/2020 | Seregin et al. | |
| 2020/0296396 A1 | 9/2020 | Wenger | |
| 2020/0404279 A1 | 12/2020 | Choi | |
| 2021/0044818 A1* | 2/2021 | Furht | H04N 19/70 |
| 2021/0044820 A1* | 2/2021 | Furht | H04N 19/176 |
| 2022/0109885 A1* | 4/2022 | Deng | H04N 19/105 |
| 2022/0124340 A1* | 4/2022 | Deng | H04N 19/70 |

OTHER PUBLICATIONS

USPTO_Library log; 2022. (Year: 2022).*
Disparity-compensated inter-layer motion prediction using standardized HEVC; 2015. (Year: 2015).*
PCT/US2020/045220; International Search Report; dated Oct. 4, 2020.
Fung et al., "New Architecture for Dynamic Frame-Skipping Transcoder", IEEE Transactions on Image Processing, Aug. 2002, retrieved on [Oct. 12, 2020). Retrieved from the internet <URL: http://ira.lib.polyu.edu. h k/bitstream/10397 /253/1 /dynamic-frame _ 02. pdf> entire document.
Fung et al., "New Architecture for Dynamic Frame-Skipping Transcoder," IEEE Transactions on Image Processing, Aug. 2002 (http://ira.lib.polyu.edu.hk/bitstream/10397/253/1/dynamic-frame_ 02.pdf).
Seregin et al., "AHG8: Scaling Window for Scaling Window Derivation," Joint Video Experts Team (JVET) of ITU-T SG 16 WP 3 and ISO/IEC JTC 1/SC 29/ WG 11, JVET-P0590-V3, Oct. 10, 2019. Downloaded from http://phenix.t-sudparis.eu/jvet/.
Hannuksela et al. "AHG19: On Adaptive Resolution Changing" JVET-0048, Mar. 2019.
Choi et al. "AHG8: Signaling and Filtering for Reference Picture Resampling" JVET-00332, Jul. 2019.
Chen et al. "AHG 8: Adaptive Resolution Change" JVET-00303-V2, Jul. 2019.
Samuelsson et al., "AHG 8: Adaptive Resolution Change (ARC) High-Level Syntax (HLS)" JVET-0204 Jul. 2019.

* cited by examiner

IMPLICIT SIGNALING OF ADAPTIVE RESOLUTION MANAGEMENT BASED ON FRAME TYPE

CROSS-REFERENCE TO RELATED APPLICATIONS

This application claims the benefit of priority of International Application No. PCT/US20/45220 filed on Aug. 6, 2020 and entitled "IMPLICIT SIGNALING OF ADAPTIVE RESOLUTION MANAGEMENT BASED ON FRAME TYPE," which claims the benefit of priority of U.S. Provisional Patent Application Ser. No. 62/883,484, filed on Aug. 6, 2019, and titled "IMPLICIT SIGNALING OF ADAPTIVE RESOLUTION MANAGEMENT BASED ON FRAME TYPE." Each of International Application No. PCT/US20/45220 and U.S. Provisional Patent Application Ser. No. 62/883,484 is incorporated by reference herein in its entirety.

FIELD OF THE INVENTION

The present invention generally relates to the field of video compression. In particular, the present invention is directed to implicit signaling of adaptive resolution management based on frame type.

BACKGROUND

A video codec may include an electronic circuit or software that compresses or decompresses digital video. It may convert uncompressed video to a compressed format or vice versa. In the context of video compression, a device that compresses video (and/or performs some function thereof) may typically be called an encoder, and a device that decompresses video (and/or performs some function thereof) may be called a decoder.

A format of compressed data may conform to a standard video compression specification. Compression may be lossy in that compressed video may lack some information present in an original video. A consequence of this may include that decompressed video may have lower quality than an original uncompressed video because there may be insufficient information to accurately reconstruct the original video.

There can be complex relationships between video quality, an amount of data used to represent a video (e.g., determined by a bit rate), complexity of encoding and decoding algorithms, sensitivity to data losses and errors, ease of editing, random access, end-to-end delay (e.g., latency), and the like.

Motion compensation may include an approach to predict a video frame or a portion thereof given a reference frame, such as previous and/or future frames, by accounting for motion of the camera and/or objects in the video. It may be employed in encoding and decoding of video data for video compression, for example in encoding and decoding using the Motion Picture Experts Group (MPEG)'s advanced video coding (AVC) standard (also referred to as H.264). Motion compensation may describe a picture in terms of transformation of a reference picture to a current picture. A reference picture may be previous in time when compared to a current picture and/or from the future when compared to the current picture.

SUMMARY OF THE DISCLOSURE

In an aspect, a decoder includes circuitry configured to receive a bit stream, determine, using the bit stream and for a current frame, whether the current frame is available to be used as a reference frame, set, in response to determining that the current frame is available to be used as a reference frame, a variable characterizing that an adaptive resolution management mode is disallowed, and reconstruct pixel data of the current frame, wherein the adaptive resolution management mode is disallowed.

In another aspect a method includes receiving a bit stream, determining, using the bit stream and for a current frame, whether the current frame is available to be used as a reference frame, setting, in response to determining that the current frame is available to be used as a reference frame, a variable characterizing that an adaptive resolution management mode is disallowed, and reconstructing pixel data of the current frame, wherein the adaptive resolution management mode is disallowed.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In many current state-of-the-art encoders, resolution is managed by re-coding and re-sending whole portion of the video known as group-of-pictures (GOP). This requires sending the intra-frame (I-frame) which can incur additional costs, since those frames are responsible for the bulk of the bits in the GOP.

Embodiments described in this disclosure relate to Adaptive Resolution Management (ARM), which is a technique that enables additional flexibility for a video encoder/decoder allowing bitrate savings in various use cases. In general, ARM includes performing a prediction using a reference frame of different resolution than a current frame. In current coding standards, reference frames have the same resolution as predicted frames. In ARM, a reference frame may be of a smaller or larger resolution than a frame being predicted. This approach may be used to downscale video resolution, thus reducing bitrate, or upscale video resolution, thus facilitating display characteristics of video playback.

ARM may alternatively or equivalently be referred to for the purposes of this disclosure as reference picture resampling (RPR); RPR and ARM may be used interchangeably.

Some implementations of the current subject matter may include using ARM for any number of frames, at any position within GOP, thus removing requirements for I-frame re-coding.

Figure 1:
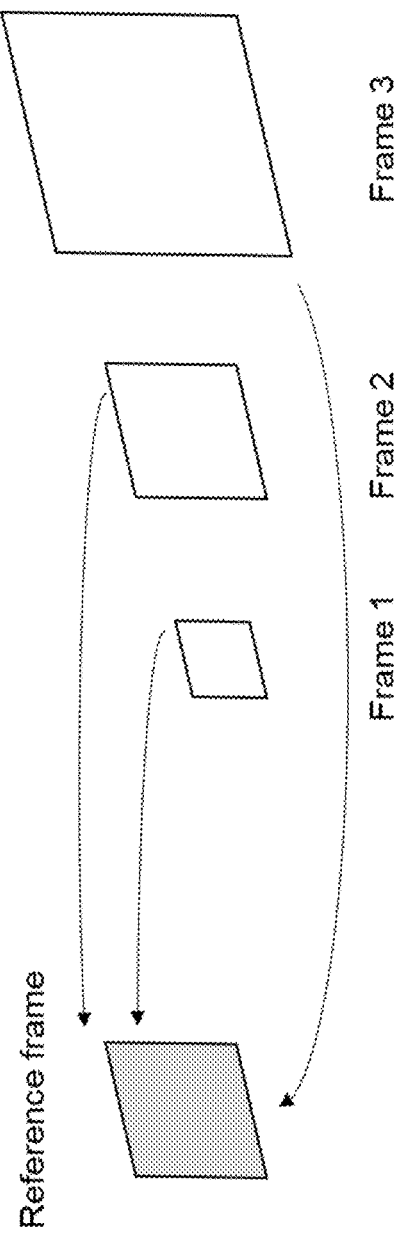
FIG. 1 is an illustration of an example reference frame and example predicted frames of various resolution scales.

FIG. 1 is an illustration of a reference frame and predicted frames of various resolution scales. Frame 1 is smaller (lower resolution) than the reference frame, Frame 2 is of same size (same resolution), while Frame 3 is larger (greater resolution). "Resolution," as used in this disclosure, is a number of pixels in a picture, frame, sub-frame, and/or other displayed area or portion thereof used in video playback, compression, or the like, with a higher number of pixels corresponding to a higher resolution, and a lower number of pixels corresponding to a lower resolution. Resolution may be measured in terms of area, for instance and without limitation by using one or more dimensions of length, measured in pixels that define an area. For instance, a circular sub-frame or other region may have a resolution defined according to a radius. Alternatively or additionally, resolution may be defined by an overall number of pixels.

As an example, and with continued reference to FIG. 1, where reference frame and/or subframe has a geometric form for which area may be defined entirely in terms of two length parameters, such as without limitation a triangular, parallelogram, and/or rectangular form, reference frame and/or subframe may have a resolution W×H, where W and H may indicate a number of pixels describing, respectively, width (or base) and height dimensions of reference frame and/or subframe. Each predicted frame may also have a resolution, which may be determined similarly to resolution of reference frame; for instance, frame 1 may have a smaller resolution WS×HS, frame 2 may have same resolution as reference frame W×H, and frame 3 may have larger resolution WL×HL. Width and height of smaller and larger frames may be obtained by multiplying reference width and height by an arbitrary rescaling constant (Rc), also referred to as a scaling factor and/or constant, which may alternatively or additionally be referred to with a variable name such as RefPicScale. In case of smaller frames, Rc may have a value between 0 and 1. In case of larger frames, Rc may have a value greater than 1; for instance, Rc may have a value between 1 and 4. Other values are possible. Rescaling constant may be different for one resolution dimension than another; for instance, a rescaling constant Rch may be used to rescale height, while another rescalling constant Rcw may be used to rescale width.

Still referring to FIG. 1, ARM may be implemented as a mode. In case of ARM mode activation at some point during decoding, a decoder may have already received a reference frame at a resolution W×H and may rescale a predicted frame using rescaling constant. In some implementations, an encoder may signal to decoder which rescaling constant to use. Signaling may be performed in a sequence parameter set (SPS) corresponding to a GOP containing current picture and/or in a picture parameter set (PPS) corresponding to current picture. For instance, and without limitation, encoder may signal rescaled parameters using fields such as a pps_pic_width_in_luma_samples, pps_pic_height_in_luma_samples, pps_scaling_win_left_offset, pps_scaling_win_right_offset, pps_scaling_win_top_offset, pps_scaling_win_bottom_offset, and/or sps_num_subpics_minus1.

Further referring to FIG. 1, W and H parameters as described above may be represented, without limitation, using variables CurrPicScalWinWidthL and CurrPicScalWinHeightL, respectively; these variables may be derived from signaled parameters as described above using one or more mathematical relationships between the signaled parameters and the variables. For instance, and without limitation, CurrPicScalWinWidthL may be derived according to the following equation:

$$\text{CurrPicScalWinWidthL} = \text{pps\_pic\_width\_in\_luma\_samples} - \text{SubWidthC} * (\text{pps\_scaling\_win\_right\_offset} + \text{pps\_scaling\_win\_left\_offset})$$

As a further non-limiting example, CurrPicScalWinHeightL may be derived according to the following equation:

$$\text{CurrPicScalWinWidthL} = \text{pps\_pic\_width\_in\_luma\_samples} - \text{SubWidthC} * (\text{pps\_scaling\_win\_right\_offset} + \text{pps\_scaling\_win\_left\_offset})$$

Persons skilled in the art, upon reviewing the entirety of this disclosure, will be aware of various alternative computations that may be used to derive the above-described variables. Encoder may alternatively or additionally signal one or more such variables, Rc, Rch, and/or Rcw directly for instance and without limitation in a PPS and/or SPS.

Alternatively or additionally, and still referring to FIG. 1, a rescaling constant and/or set of rescaling constants as described above may be signaled in a bitstream using a reference to an index of a stored scaling constant and/or constants, and/or of a frame and/or block that was signaled using a previously signaled and/or utilized scaling constant and/or constants. Reference to index of a stored scaling constant may be signaled explicitly and/or determined from one or more additional parameters signaled in bitstream. For instance, and without limitation, decoder may identify a reference frame and/or group of pictures containing a current frame; where a rescaling constant has previously been signaled and/or used in such a group of pictures, with a reference frame signaled as applicable to current frame and/or current group of pictures, or the like, decoder may identify that rescaling constant for use as a rescaling constant with the current frame.

Figure 2:
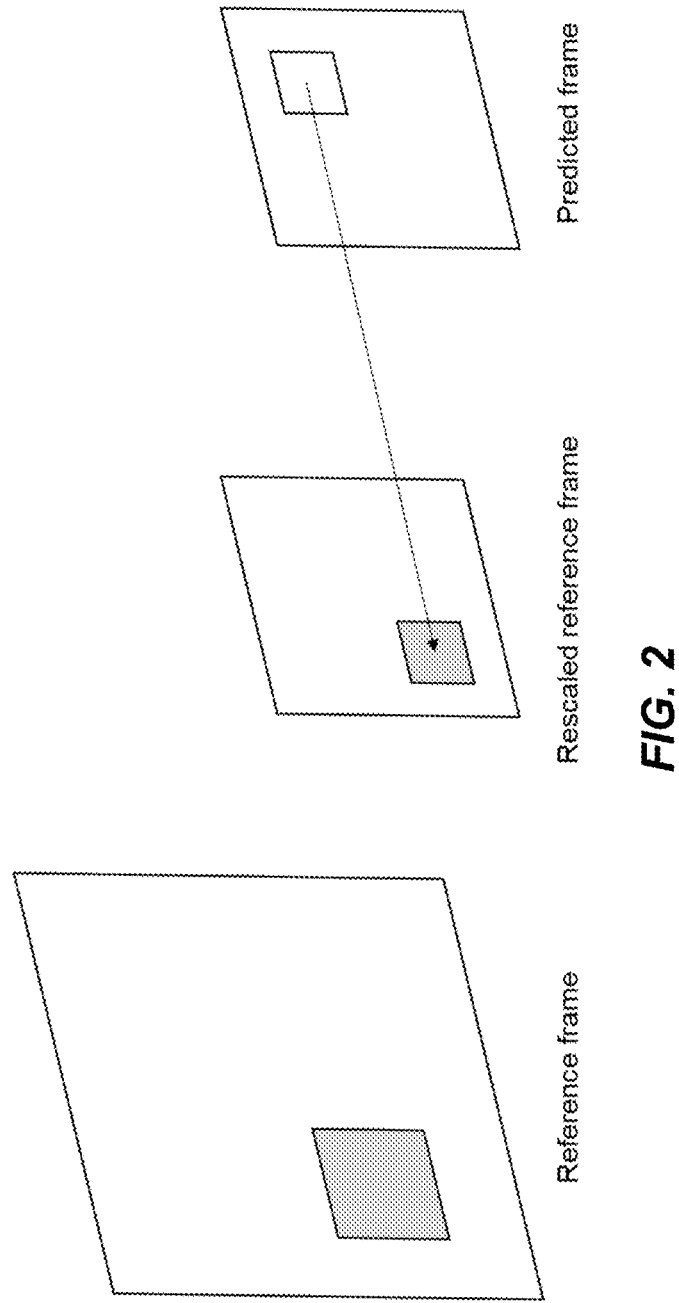
FIG. 2 is an illustration depicting an example reference frame, an example rescaled reference frame, and an example subsequent block prediction process.

In some implementations, and with continued reference to FIG. 1, ARM operation may be executed on a block level of encoded frames. For example, a reference frame may first be rescaled and subsequently prediction may be performed, as depicted in FIG. 2. FIG. 2 is an illustration depicting a reference frame, a rescaled reference frame, and a subsequent block prediction process. Block prediction process may be performed on a scaled reference frame (having a scaled resolution) rather than the original reference frame. Rescaling reference frame may include rescaling according to any parameter signaled by an encoder as described above; for instance and without limitation, where a reference frame to be used with current picture is signaled, such as via a reference to an index value associated with reference frame or the like, the signaled reference frame may be rescaled, prior to prediction, according to any method of rescaling described above. A rescaled reference frame may be stored in memory and/or in a buffer, which may include without limitation a buffer identifying frames contained therein by indices, according to which frame retrieval may be performed; buffer may include a decoded picture buffer (DCB) and/or one or more additional buffers implemented by decoder. Prediction process may include, for example, inter picture prediction including motion compensation.

Some implementations of block-based ARM may enable flexibility in applying optimal filters for each block, instead of applying same filter for a whole frame. In some implementations, a skip-ARM mode may be possible such that some blocks (based for example on the uniformity of the pixels and bitrate cost) can be in a skip-ARM mode (such that rescaling would not change the bitrate). Skip-ARM mode may be signaled in a bitstream; for instance, and without limitation, skip-ARM mode may be signaled in a PPS parameter. Alternatively or additionally, decoder may determine that skip-ARM mode is active based on one or more parameters set by decoder and/or signaled in bitstream. Spatial filters used in block-based ARM may include, without limitation, bicubic spatial filters that apply bicubic interpolation, bilinear spatial filters that apply bi-linear interpretation, Lanczos filters that use Lanczos filtering and/or Lanczos resampling using combinations of sine filters, sine-function interpolation and/or signal reconstruction techniques, or the like; persons skilled in the art, upon reviewing the entirety of this disclosure, will be aware of various filters that may be used for interpolation consistently with this disclosure. Interpolation filters may include, as a non-limiting example, any filters described above, a low-pass filter, which may be used, without limitation, by way of an up-sampling process whereby pixels between pixels of block and/or frame previous to scaling may be initialized to zero, and then populated with an output of the low-pass filter. Alternatively or additionally, any luma sample interpolation filtering process may be used. Luma sample interpretation may include computation of an interpolated value at a half-sample interpolation filter index, falling between two consecutive sample values of a non-scaled sample array. Computation of interpolated value may be performed, without limitation, by retrieval of coefficients and/or weights from lookup tables; selection of lookup tables may be performed as a function of motion models of coding units and/or scaling ratio amounts, for instance as determined using scaling constants as described above. Computation may include, without limitation, performing weighted sums of adjacent pixel values, where weights are retrieved from lookup tables. Computed values may alternatively or additionally be shifted; for instance and without limitation, values may be shifted by Min(4, BitDepth—8), 6, Max(2, 14—BitDepth), or the like. Persons skilled in the art, upon reviewing the entirety of this disclosure, will be aware of various alternative or additional implementations that may be used for interpolation filters.

Still referring to FIG. 2, adaptive resolution management may allow rescaling frames and/or regions of frames to improve compression efficiency and/or quality. A key challenge is reproducibility of re-scaling methods at the decoder. Depending on rescaling methods used, a decoder and encoder may not be able to reproduce identical scaled back frames. In such cases, using rescaled frames as reference frames may cause prediction mismatch and/or cause encoder and decoder to drift. Drift may become visible as a coding artifact (quality problem). To avoid these drift problems, implicit and explicit signaling of ARM may be utilized, as described in this disclosure.

For example, and with further reference to FIG. 2, implicit signaling of ARM may be based on frame type. For example, in some implementations, decoder and/or encoder may be configured such that a frame that may be used as a reference frame cannot be encoded using ARM; in other words, ARM may be disallowed for frames available as reference frames. For example, if a frame type or slice type signaled in the picture header indicates that a frame is available for use as a reference frame, such as for instance a frame signaled in the picture header as being I or type P, then a decoder and/or encoder may determine that the frame cannot be encoded using ARM and all ARM related parameters may not be present in a picture header of the frame. Parameters as described above may be signaled, without limitation, in an SPS and/or PPS. For instance, SPS may signal a parameter denoted sps_res_change_in_clvs_allowed_flag, which when equal to 1 may specify that a picture spatial resolution might change. One aspect of resolution management may signal that resolution might change in the sequence. As a further non-limiting example, a gci_no_ref_pic_resampling_constraint_flag equal to 1 may specify that sps_ref_pic_resampling_enabled_flag for all pictures in OlsInScope will be equal to 0. gci_no_ref_pic_resampling_constraint_flag equal to 0 may not impose such a constraint. In a slice header, sh_slice_type may specify a coding type of the slice between types I, P, B. A ph_non_ref_pic_flag equal to 1 may specify that a current picture is never used as a reference picture. ph_non_ref_pic_flag equal to 0 may specify that a current picture might or might not be used as a reference picture.

Figure 3:
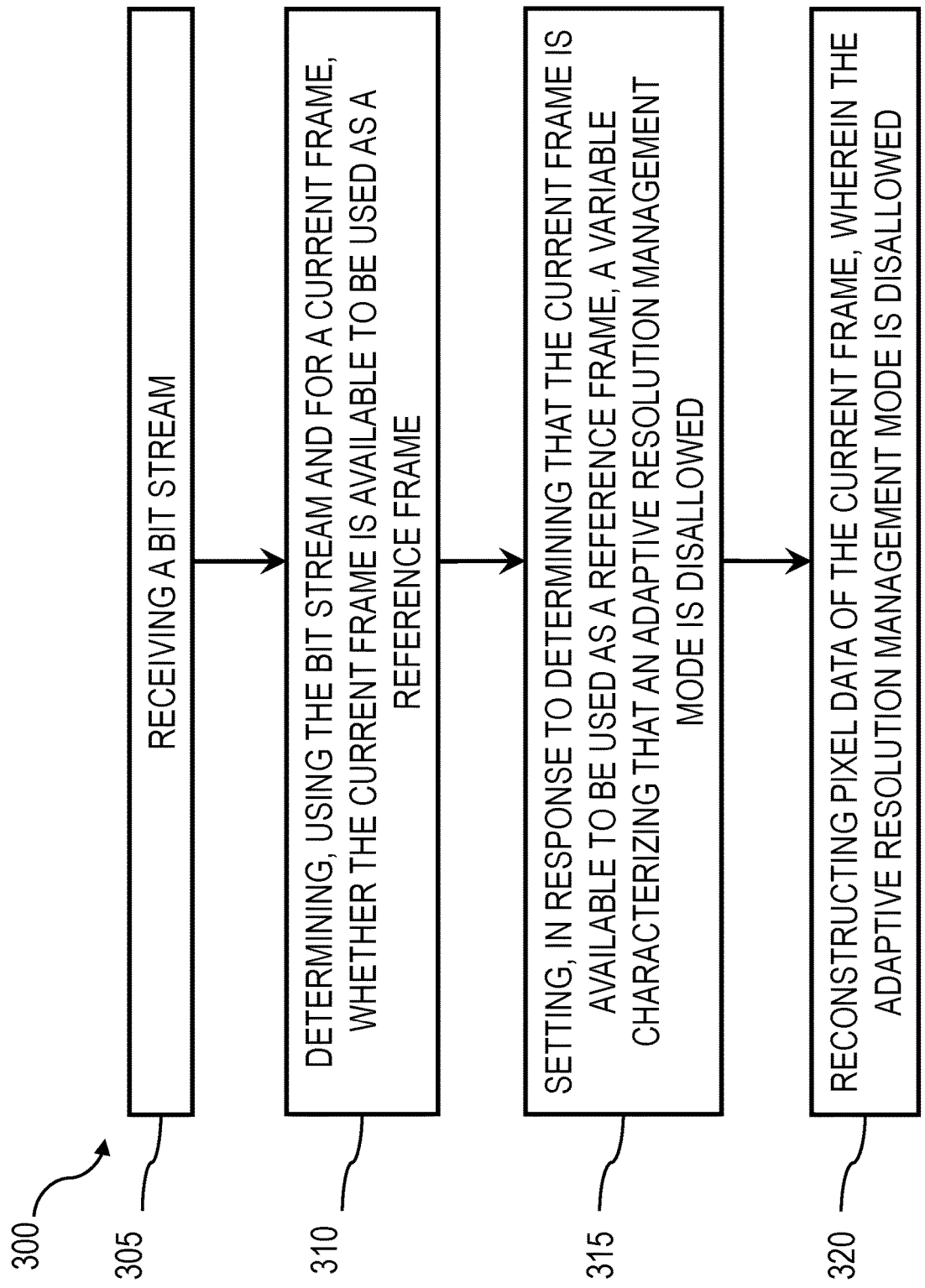
FIG. 3 is a process flow diagram illustrating an example process according to some implementations of the current subject matter.

FIG. 3 is a process flow diagram illustrating an exemplary embodiment of a process 300 of adaptive resolution management that may enable additional flexibility for a video encoder/decoder allowing bitrate savings in various use cases.

At step 305, and continuing to refer to FIG. 3, a bit stream is received by a decoder. A current block may be contained within a bit stream that decoder receives. Bit stream may include, for example, data found in a stream of bits that is input to a decoder when using data compression. Bit stream may include information necessary to decode a video. Receiving may include extracting and/or parsing a block and associated signaling information from bit stream. In some implementations, a current block may include a slice, a tile, coding tree unit (CTU), a coding unit (CU), a prediction unit (PU) and/or any other portion of a frame and/or picture.

At step 310, and still referring to FIG. 3 whether a current frame is available to be used as a reference frame may be determined using bit stream. In some implementations, determining whether a current frame is available to be used as a reference frame includes determining whether a type of the current frame is type I or type P as described above. As a non-limiting example, in a slice header, sh_slice_type may specify a coding type of a slice between types I, P, and B. A type of a current frame may be signaled in bit stream. In some implementations, and as a non-limiting example current frame may include a slice, defined as a set of CTUs in a tile and/or a set of integral numbers of consecutive tiles.

Still referring to FIG. 3, at step 315 a variable characterizing that an adaptive resolution management mode is disallowed may be set in response to determining that a current frame is available to be used as a reference frame. In some implementations, parameters associated with an adaptive resolution management mode are not present in a picture header of current frame. As a non-limiting example, an SPS may signal sps_res_change_in_clvs_allowed_flag equal to 1, specifying that a picture spatial resolution might change. Disabling based on slice type may be signaled at an encoder based on picture type.

At step 340, and further referring to FIG. 3, pixel data of a current frame may be reconstructed. Adaptive resolution management mode may be disallowed during reconstruction. In an embodiment, determination that current frame is not available as a reference frame may lead to determination that ARM is available. For instance, SPS may signal sps_res_change_in_clvs_allowed_flag equal to 1, specifying that picture spatial resolution might change, for instance as described above.

Figure 4:
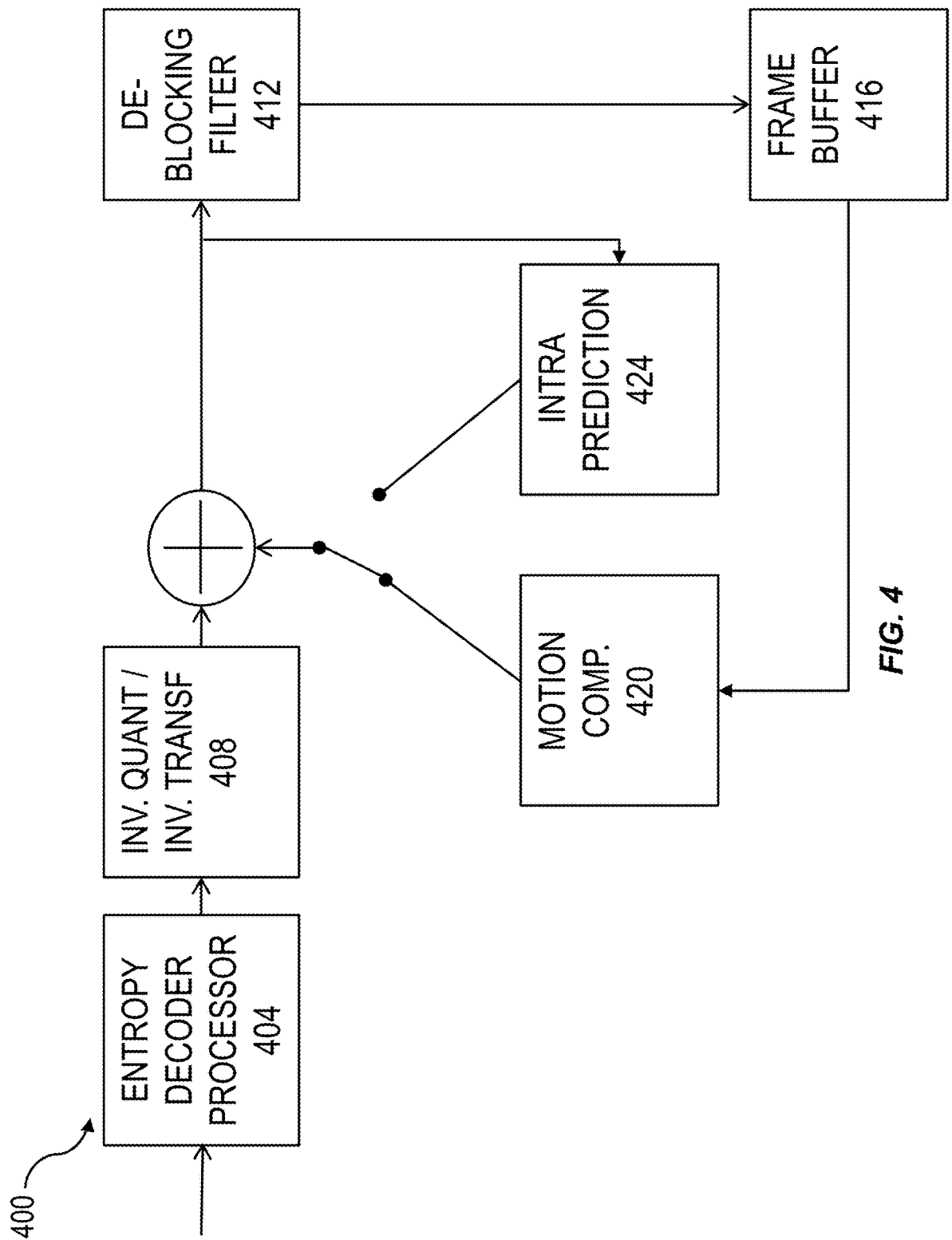
FIG. 4 is a system block diagram illustrating an example decoder capable of decoding a bit stream according to some implementations of the current subject matter.

FIG. 4 is a system block diagram illustrating an example decoder 400 capable of adaptive resolution management based on frame type as described in this disclosure. Decoder 400 may include an entropy decoder processor 404, an inverse quantization and inverse transformation processor 408, a deblocking filter 412, a frame buffer 416, a motion compensation processor 420 and/or an intra prediction processor 424.

In operation, and still referring to FIG. 4, bit stream 428 may be received by decoder 400 and input to entropy decoder processor 404, which may entropy decode portions of bit stream into quantized coefficients. Quantized coefficients may be provided to inverse quantization and inverse transformation processor 408, which may perform inverse quantization and inverse transformation to create a residual signal, which may be added to an output of motion compensation processor 420 or intra prediction processor 424 according to a processing mode. An output of the motion compensation processor 420 and intra prediction processor 424 may include a block prediction based on a previously decoded block. A sum of prediction and residual may be processed by deblocking filter 412 and stored in a frame buffer 416.

Figure 5:
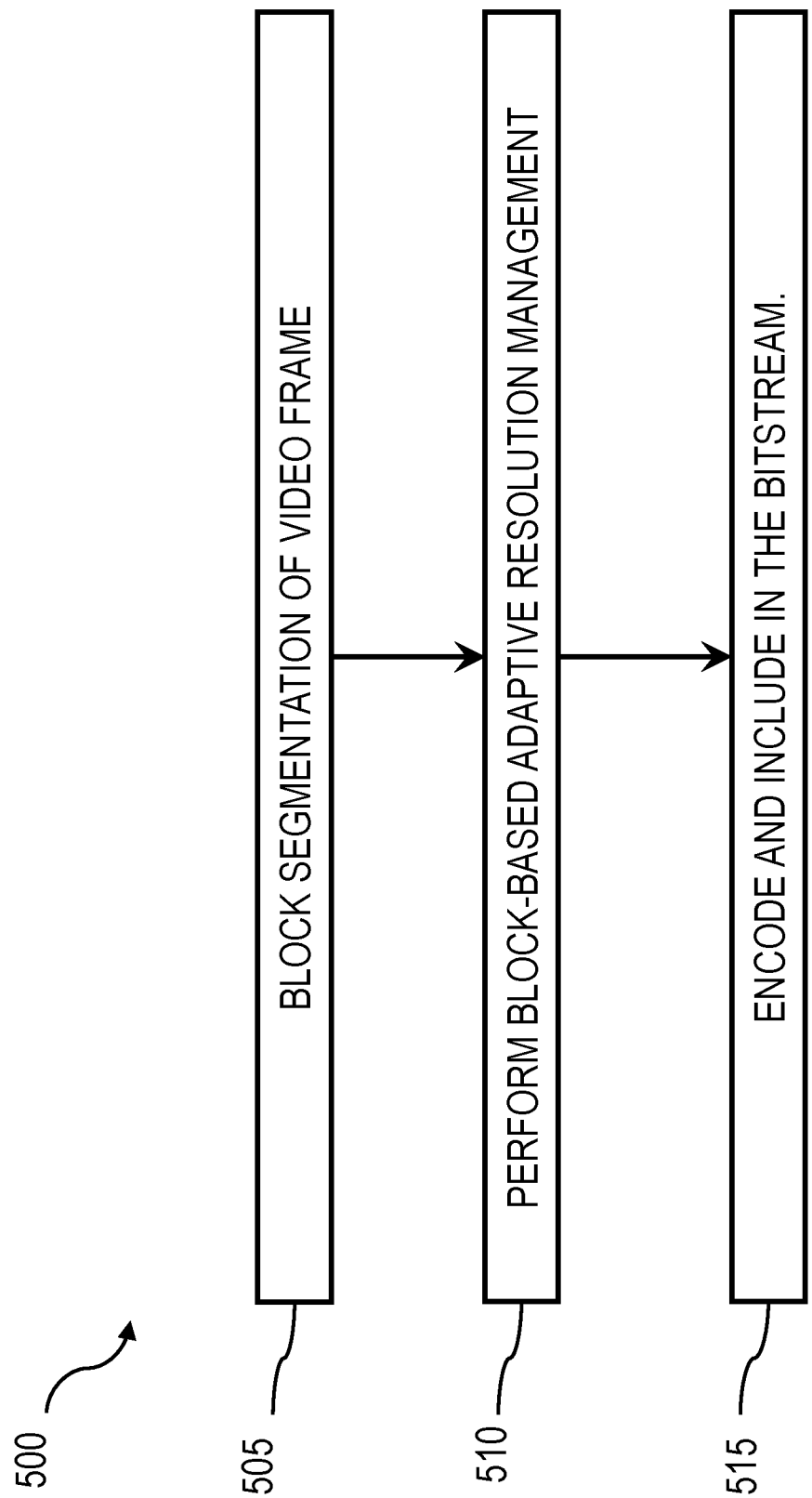
FIG. 5 is a process flow diagram illustrating an example process of encoding a video according to some implementations of the current subject matter.

FIG. 5 is a process flow diagram illustrating an example process 500 of encoding a video with adaptive resolution management that may enable additional flexibility for a video encoder and/or decoder allowing bitrate savings in various use cases. At step 505, a video frame may undergo initial block segmentation, for example, using a tree-structured macro block partitioning scheme that may include partitioning a picture frame into CTUs and CUs.

At step 510, block-based adaptive resolution management may be performed, including resolution scaling of a frame or portion thereof.

At step 515, a block may be encoded and included in a bit stream. Encoding may include utilizing inter prediction and intra prediction modes, for example.

Figure 6:
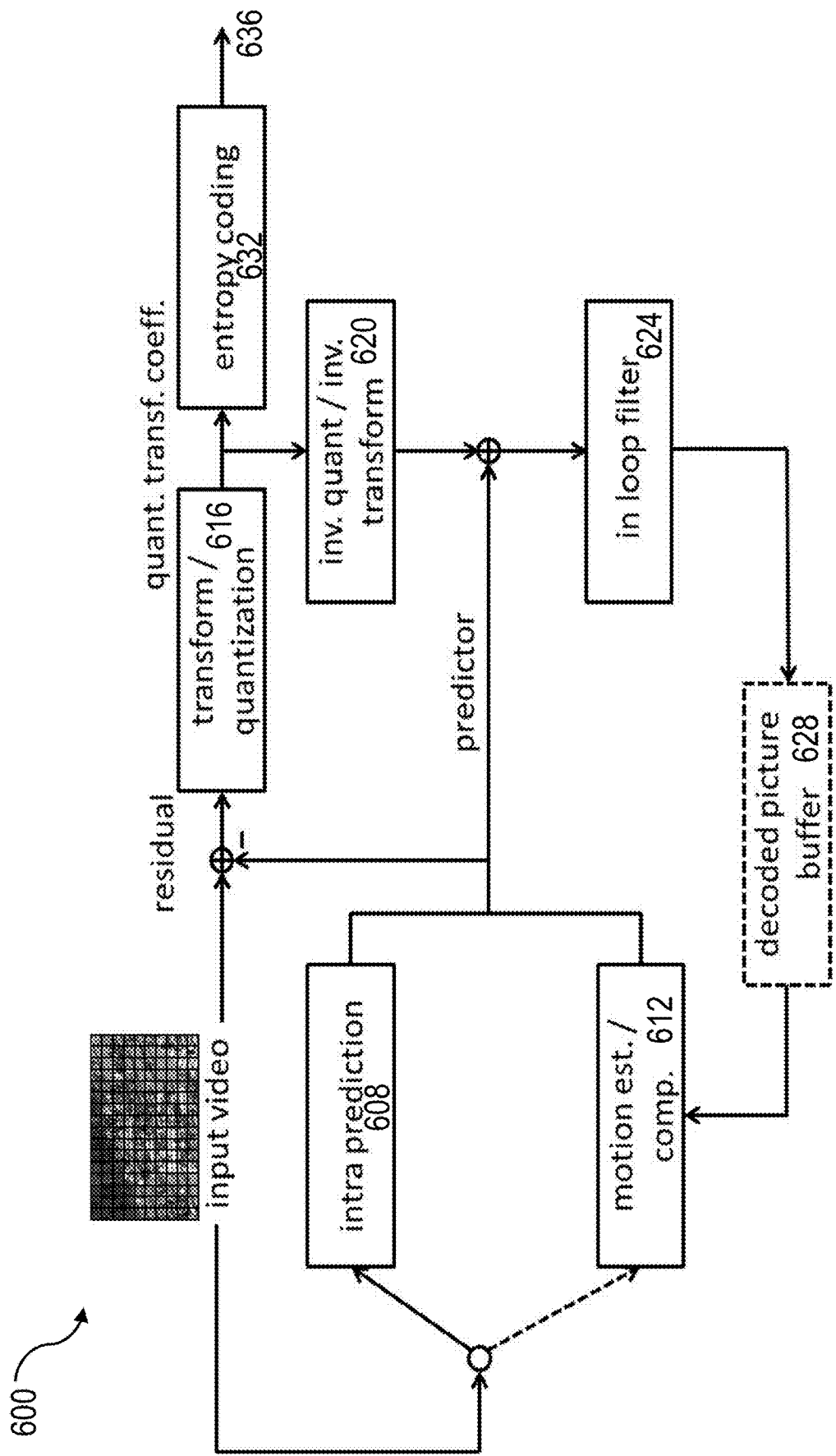
FIG. 6 is a system block diagram illustrating an example video encoder according to some implementations of the current subject matter.

FIG. 6 is a system block diagram illustrating an example video encoder 600 capable of adaptive resolution management based on frame type as described in this disclosure. Example video encoder 600 may receive an input video 604, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 6, example video encoder 600 may include an intra prediction processor 608, a motion estimation/compensation processor 612, which may also be referred to as an inter prediction processor, capable of constructing a motion vector candidate list including adding a global motion vector candidate to the motion vector candidate list, a transform/quantization processor 616, an inverse quantization/inverse transform processor 620, an in-loop filter 624, a decoded picture buffer 628, and/or an entropy coding processor 632. Bit stream parameters may be input to the entropy coding processor 632 for inclusion in the output bit stream 636.

In operation, and with continued reference to FIG. 6, for each block of a frame of input video 604, whether to process block via intra picture prediction or using motion estimation/compensation may be determined. Block may be provided to intra prediction processor 608 or motion estimation/compensation processor 612. If block is to be processed via intra prediction, intra prediction processor 608 may perform processing to output a predictor. If block is to be processed via motion estimation/compensation, motion estimation/compensation processor 612 may perform processing including constructing a motion vector candidate list including adding a global motion vector candidate to the motion vector candidate list, if applicable.

Further referring to FIG. 6, a residual may be formed by subtracting a predictor from input video. Residual may be received by transform/quantization processor 616, which may perform transformation processing (e.g., discrete cosine transform (DCT)) to produce coefficients, which may be quantized. Quantized coefficients and any associated signaling information may be provided to entropy coding processor 632 for entropy encoding and inclusion in output bit stream 636. Entropy encoding processor 632 may support encoding of signaling information related to encoding a current block. In addition, quantized coefficients may be provided to inverse quantization/inverse transformation processor 620, which may reproduce pixels, which may be combined with a predictor and processed by in loop filter 624, an output of which may be stored in decoded picture buffer 628 for use by motion estimation/compensation processor 612 that is capable of constructing a motion vector candidate list including adding a global motion vector candidate to the motion vector candidate list.

With continued reference to FIG. 6, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 6, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 6, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

In some embodiments disclosed herein, a decoder may include circuitry configured to receive a bit stream, determine, using the bit stream and for a current frame, whether the current frame is available to be used as a reference frame, set, in response to determining that the current frame is available to be used as a reference frame, a variable characterizing that an adaptive resolution management mode is disallowed, and reconstruct pixel data of the current frame, wherein the adaptive resolution management mode is disallowed.

In some embodiments determining whether the current frame is available to be used as a reference frame may include determining whether a type of the current frame is type I. Determining whether the current frame is available to be used as a reference frame may include determining whether a type of the current frame is type P. A type of the current frame may be signaled in the bit stream. The current frame may be a slice. Parameters associated with the adaptive resolution management mode may not be present in a picture header of the current frame. The decoder may be further configured to decode, from the bitstream, a current block. A current block may include a coding tree unit. The current block may include a prediction unit. The decoder may include an entropy decoder processor configured to receive the bit stream and decode the bit stream into quantized coefficients, an inverse quantization and inverse transformation processor configured to process the quantized coefficients including performing an inverse discrete cosine, a deblocking filter, a frame buffer, and an intra prediction processor.

Embodiments disclosed herein include a method including receiving a bit stream, determining, using the bit stream and for a current frame, whether the current frame is available to be used as a reference frame, setting, in response to determining that the current frame is available to be used as a reference frame, a variable characterizing that an adaptive resolution management mode is disallowed, and reconstructing pixel data of the current frame, wherein the adaptive resolution management mode is disallowed.

In some embodiments, determining whether the current frame is available to be used as a reference frame may include determining whether a type of the current frame is type I. Determining whether the current frame is available to be used as a reference frame includes determining whether a type of the current frame is type P. A type of the current frame may be signaled in the bit stream. The current frame may be a slice. Parameters associated with the adaptive resolution management mode may not be present in a picture header of the current frame. The method may include decoding from the bitstream, a current block. The current block may include a coding tree unit. The current block may include a prediction unit. At least one of the receiving, the determining, the setting, and the reconstructing may be performed by a decoder including an entropy decoder processor configured to receive the bit stream and decode the bit stream into quantized coefficients, an inverse quantization and inverse transformation processor configured to process the quantized coefficients including performing an inverse discrete cosine, a deblocking filter, a frame buffer, and an intra prediction processor.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
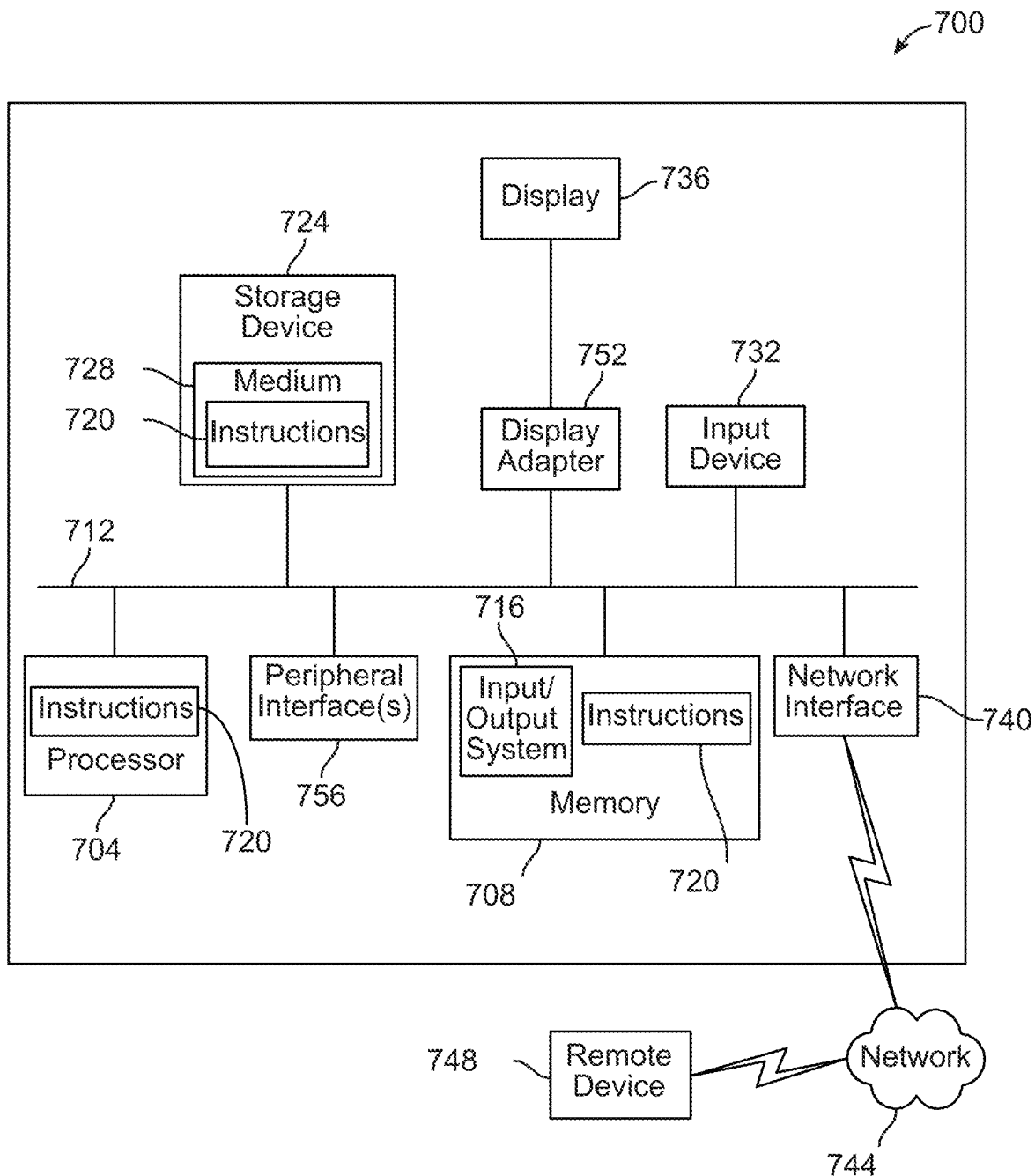
FIG. 7 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder having an inter-prediction a mode for generating a predictor from a reference picture for a subsequent picture having a spatial resolution different from the reference picture, the decoder configured to:
   receive an encoded bitstream including a first picture and a subsequent picture and a header associated with the first picture but not the subsequent picture, the subsequent picture having a different spatial resolution than the first picture, the header associated with the first picture not including parameters for utilizing the mode;
   decode the first picture in response to the header and not utilizing the mode;
   retain the decoded first picture as a reference picture for the subsequent picture;
   scale the spatial resolution of a block of pixels of the reference picture using a scale factor signaled in the encoded bitstream and using a filter chosen for the particular block of the reference picture and not the reference picture as a whole to form a predictor; and
   decode a block of pixels of the subsequent picture by adding residual pixel values to the predictor.

* * * * *